H. A. LONGINO.
RAIN SIGNAL.
APPLICATION FILED OCT. 20, 1915.
1,207,950.
Patented Dec. 12, 1916.
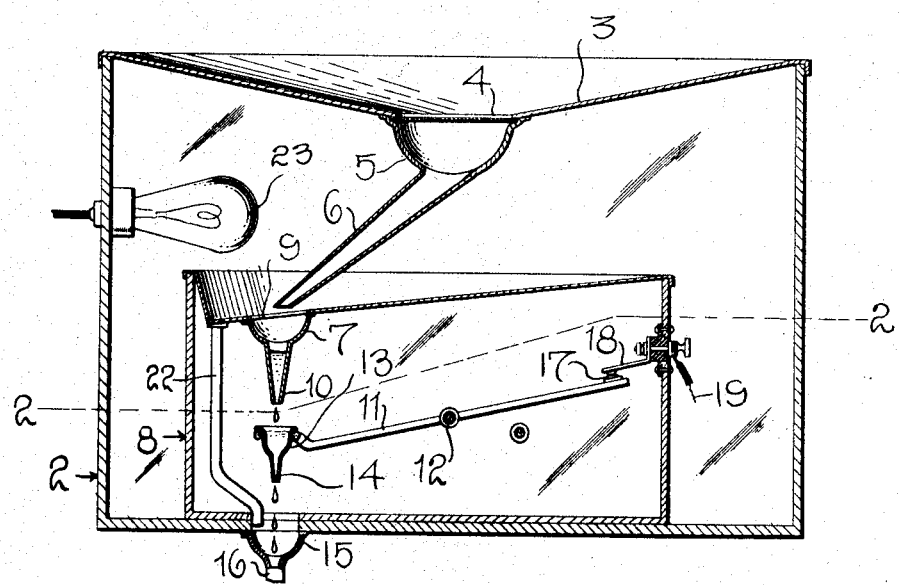
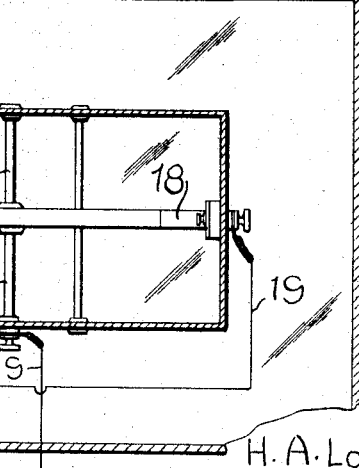
Inventor
H. A. LONGINO
By Watson E. Coleman
Attorney

UNITED STATES PATENT OFFICE.

HUGH ALVIN LONGINO, OF LA GRANGE, KENTUCKY.

RAIN-SIGNAL.

1,207,950.  Specification of Letters Patent.  Patented Dec. 12, 1916.

Application filed October 20, 1915. Serial No. 56,985.

*To all whom it may concern:*

Be it known that I, HUGH ALVIN LONGINO, a citizen of the United States, residing at La Grange, in the county of Oldham and State of Kentucky, have invented certain new and useful Improvements in Rain-Signals, of which the following is a specification, reference being had to the accompanying drawings.

This invention relates to automatic alarms or signals, and the primary object is the provision of a device so constructed that it will sound an alarm or otherwise actuate a signal at the beginning of a rain storm. The device is adapted to be used in private houses for the purpose of warning the householders of the beginning of a shower so that they may close windows and doors and is particularly adapted under these circumstances for use at night as, if the inhabitants of the house are asleep, considerable damage may be done by sudden showers.

A further use of the invention is for transmitting for long distances a signal indicating the beginning of a rain and the termination of a rain at a distant place.

Another object of the invention is the provision of means for collecting the falling drops over a relatively large area in order to cause the water so collected to actuate the alarm, and another object is to provide means for housing an electric bulb which in cold weather will prevent the water from freezing.

A further object of the invention is to provide a balance so constructed that a certain amount of water when collected in it will cause the balance to fall and close the circuit through an electrically actuated alarm, and a further object is to provide means whereby a certain amount of water will actuate the alarm while a less amount of water than this will not do so, and whereby the water may run off from the cup of the balance when the rain has stopped so as to cause the balance to automatically return to its initial position and thus break the circuit through the alarm.

Other objects will appear in the course of the following description.

My invention is illustrated in the accompanying drawings, wherein:

Figure 1 is a vertical section of my apparatus; Fig. 2 is a section on the line 2—2 of Fig. 1.

Referring to these figures, 2 designates an inclosing casing of wood or other suitable material. The top of this casing is depressed toward the center of the top so that all the water falling upon the top of the casing will move toward the center. At the center of this top 3 there is provided an opening 4 which is preferably screened, and below this opening there is disposed a collecting hopper 5 whose outlet pipe 6 extends downward to the collecting hopper 7 of the interior casing 8. This interior casing 8 is disposed within the casing 2 and is smaller than the casing 2 and is provided with an opening 9 beneath which the hopper 7 is disposed. The hopper 9 extends downward and has a contracted delivery end 10.

Mounted within the casing 8 is a balanced arm 11, the pivots of this balanced arm being designated 12. This balanced arm carries upon one end the receiving cup 13 having a relatively large open upper end into which the delivery end 10 of the hopper 7 discharges and a relatively small lower end or discharging end 14 through which the water passing into the cup discharges into a drainage opening 15 formed at the bottom of the casing 8. This drainage opening is connected to a discharge pipe 16 whereby the water may be carried away.

The balance 11 at one end carries any suitable contact member 17, which, when the cup 13 is filled with water, is raised against a contact member and stop 18. The pivot pin 12 of the balance and the stop 18 are electrically connected by the wires 19 in circuit with any suitable alarm or signal which is designated generally 20, this signal being an electric signal actuated by the battery 21 to any suitable source of current. When the cup end of the balance is lowered under the weight of the water in the cup the circuit to the signal 20 and the battery is completed and the signal is sounded. This signal may be in the form of a buzzer, a bell, a light, or an annunciator, as the particular form of the signal forms no part of my invention. When the cup 13 is empty the balance will return so as to carry the cup upward and carry the contact member 17 out of contact with the stop 18, thus breaking the circuit through the signal.

In order to provide against an overflow of water through the pipe 6 which could not escape through the opening 10 and which would fill the outer casing, I form the top of the interior casing with a depressed end portion so that any water which may accumulate upon the top of the casing will collect at one point, and from this depressed portion I extend the overflow pipe 22 which connects with the discharge pipe 16 in any suitable manner. In order to prevent the water from freezing in cold weather as it passes from the hopper 5 down the pipe 6 to the hopper 7, I provide the electric bulb 23 which is disposed within the exterior casing 2 and which sufficiently warms the air within the exterior casing as to prevent any freezing of the water.

The operation of this invention will be obvious from what has gone before. The cup 13 has a relatively large mouth and a relatively small outlet in the bottom. This allows the water to pass through the cup but delays the passage of the water. Under ordinary circumstances I have found in practice that three drops of water in the mouth of the cup will cause the cup end of the balance to dip and close the circuit through the alarm. Inasmuch as the water runs off from the cup much more slowly than it enters the cup, it will be obvious that the cup will remain filled so long as the rain or shower continues but that as soon as the shower ends the water will run off faster from the cup than it will enter and the balance will raise and break the electrical connections through the alarm. It will of course be obvious that in a heavy shower more water will run into the cup than can possibly pass through the discharge end thereof and that the water will overflow from the cup but in this case the water will be discharged through the discharge opening 15. The purpose of the outer casing is to afford a relatively large area for the collection of water and also to provide means whereby the parts of the device may be kept warm in case of freezing weather. Furthermore, it assists in protecting the relatively delicate parts of the mechanism from the action of wind and snow. The purpose of the interior casing is to support the hopper 7 and support and protect the delicate mechanism of the balance.

As before stated, this device is adapted to be used in private families to warn householders of the beginning of a shower and may be also used to transmit from one town to another a signal indicating the beginning of a storm in the first city, and will also indicate the termination of the storm. To-day reports as to the beginning and termination of a storm are transmitted by telegraph from one weather office to another. By my device this transmission report may be made automatic. Furthermore, it will be obvious that the device may be connected to a register so that the beginning, termination and duration of a storm may be readily indicated. Preferably, the device will be made of aluminum as this metal has but little attraction for electricity and does not rust.

While I have illustrated certain details of construction, I wish it understood that these details may be changed in many ways without departing from the spirit of the invention.

Having thus described the invention, what is claimed is:

1. A rain signal of the character described including a balanced member provided at one end with a signaling device and at the other end with a rain receiving cup having an opening in its bottom, that end of the balanced member carrying the signaling device normally overbalancing the end of the member carrying the cup, and means for directing rain water into the cup.

2. A rain signal of the character described including a casing having a collecting area with an opening, a balanced member disposed within the casing and provided at one end with a cup having a receiving opening and a discharge opening in its bottom and at the other end with an element of a signaling device, the end of the member having the signaling device being of greater weight than the cup when the latter is only partly full, and means for conducting water from the said collecting area to the cup and for discharging excess water from the collecting area.

3. A rain signal of the character described including a casing having a rain collecting top formed with a discharge opening, a balanced member mounted within the casing and provided at one end with a cup having a receiving opening and a relatively small discharge opening in its bottom and at its other end with a signaling element, the last-named end of the member being heavier than the cup when the latter is partially filled, a hopper leading from the opening of the collecting area and discharging into the cup, the casing being formed with a discharge opening disposed below the cup.

4. A rain signal of the character described comprising an outer casing having a rain collecting top formed with an opening, an inner casing, a hopper leading from the collecting opening of the top of the outer casing into the inner casing, a balanced member mounted within the inner casing, a cup mounted upon one end of the balanced member and into which the hopper is adapted to discharge, a signal element mounted upon the opposite end of the balanced member and normally counterbalancing the cup when the latter is empty or partially filled, and means disposed between the outer and inner casings for heating the air within the outer casing.

5. A rain signal of the character described including an outer casing formed with a water collecting top and with a receiving opening, an inner casing also formed with a water collecting top and a discharge opening, a hopper located within the receiving opening of the outer casing and leading to the opening of the inner casing, a hopper disposed within the inner casing below said opening, a balanced rod mounted within the inner casing carrying at one end a cup and at the other end a signaling element, the cup having a relatively large upper end and a relatively small opening in its lower end, a drain pipe leading from the interior of the interior casing and beneath the cup, and a drain pipe leading from the collecting surface of the interior casing to said first-named drain pipe.

In testimony whereof I hereunto affix my signature in the presence of two witnesses.

H. ALVIN LONGINO.

Witnesses:
W. W. HAMPTON,
G. W. HAMPTON.

Copies of this patent may be obtained for five cents each, by addressing the "Commissioner of Patents, Washington, D. C."